United States Patent

Chao

Patent Number: 5,152,440
Date of Patent: Oct. 6, 1992

[54] FOLDABLE BAG WITH ROLLER MECHANISM

[76] Inventor: Wei Y. Chao, 175 Linmore Dr., Fremont, Calif. 94539

[21] Appl. No.: 531,000

[22] Filed: May 31, 1990

[51] Int. Cl.⁵ .............................................. B60R 7/00
[52] U.S. Cl. .............................. 224/42.46 R; 224/273; 224/277; 224/901; 383/11; 383/22; 242/107.7
[58] Field of Search ............... 224/42.45, 42.46, 273, 224/277, 282; 383/11, 22; 242/107.7, 107.6, 107.4; 160/127; 296/97.7, 97.8, 37.5, 37.13; 220/483

[56] References Cited

U.S. PATENT DOCUMENTS

| | | | |
|---|---|---|---|
| 1,580,705 | 4/1926 | Wittmann | 224/42.45 R |
| 1,814,293 | 7/1931 | Christie | 296/97.8 |
| 2,876,980 | 3/1959 | Slater | 248/359 |
| 2,884,174 | 4/1959 | Davitt | 224/42.46 |
| 2,965,344 | 12/1960 | Baker | 248/101 |
| 3,260,488 | 7/1966 | Kliewer et al. | 248/99 |
| 3,424,422 | 1/1969 | Klangos | 248/330 |
| 3,598,297 | 8/1971 | Welch | 224/42.46 R |
| 4,850,508 | 7/1989 | Lee | 220/407 |

*Primary Examiner*—Henry J. Recla
*Assistant Examiner*—Scott Flanders

[57] ABSTRACT

A foldable bag 31 for storing items in an automobile comprises a roller assembly 19 for extending and retracting purpose, suction cups 10 and supporting brackets 11 12 for attaching, a roller tightener 29, an extension web 30, a bag 31 which can be folded in compacted form, an opening and closing frame 32 33 34, and rigid back panel 38 covered with soft vinyl and upon which an elastic band 39 is hung for additional attachment.

1 Claim, 10 Drawing Sheets

FOLDABLE BAG WITH ROLLER MECHANISM

BACKGROUND

1. Field of Invention

My invention relates to a container, and more particularly to a foldable container or bag which is connectable to a roller and which is usable in automotive vehicles.

2. Prior Art

People spend more and more hours in their car. People bring fast foods, snacks, or their breakfast and eat in their cars. But it is a problem to find a place for putting or holding the food bag, which often is greasy.

For long-distance trips or travelling in large metropolitan areas, people usually need more maps, tour books or atlases than the small glove compartment can contain. They also need these maps in a easy-to-reach place instead being scattered on the car seat or floor. More often there is indispensable need for a place to put litter, such as fast-food wrappings, fruit skins or cores, soft drink bottles, baby diapers, facial tissues, paper towels, etc. During long distance drives, the need becomes greater.

Prior auto containers can, by and large, be classified according to their attachment means, holding capacity, and utilities:

(a) One popular way of attaching a container to the inside of a vehicle is to suspend a plastic, vinyl bag from such structures as the cigarette lighter knob, a radio knob, a latch, or a handle. Because of their soft and flexible nature in both construction and material, most these prior-art bags have a tendency to droop and collapse. Also they have a narrow slit opening which often makes it difficult to put things in them. Since they are hung from knobs, latches, or handles, their capacity is limited.

(b) Other prior-art containers are often affixed permanently to the vehicle. For instance, U.S. Pat. No. 3,632,029 to Sonner (1972) discloses a litter container structure that is mounted by screwing a supporting member onto the vehicle's seat or other supporting structure. Another form of permanent attachment is to fasten the bag onto the dashboard or an easy to reach place with an adhesive strip at the back of the supporting member. Since the easy-to-reach position, such as the dashboard, is usually conspicuous, most people are reluctant to use it since the adhesive will leave a permanent mark thereon.

(c) Attachments which use the insertion of a thin member into the auto window slot are also known, for example, in U.S. Pat. Nos. 4,154,383 to Honatzis (1979), and 4,865,237 (1989) to Allen. This form of attachment also runs into a variety of problems. For example, the slot between the window glass and the inner weatherstrip may be too tight to accept the thin member. Also the member might cause damage to weatherstrip. Or when not in use, finding a place for the supporting unit with the thin member which is usually shaped like a hook, could require additional care.

U.S. Pat. No. 4,850,508 (1989) to Lee discloses a litter disposal mechanism. It employs a container for holding a roll of litter bags. The bag is suspended in front of the container. While this device has the advantage of providing a continuous supply of litter bags, its bag opening device is rather awkward so that it is difficult to put things into the bag. And it is almost impossible to take things out. Thus, it is limited to receiving litter.

In sum, prior vehicle containers suffer from a number of drawbacks including lack of useful size, awkward opening, leaving permanent marks on conspicuous place, hindrance when not in use, etc.

OBJECTS AND ADVANTAGES

Accordingly, several objects and advantages of the present invention are to provide a vehicle container which overcomes all of the foregoing disadvantages. It has a useful size and an opening ready for putting things in and taking things out. It leaves no permanent marks on a conspicuous place and requires no insertion into the window's slot as the container is attached to auto windshield by means of suction cups. There are additional advantages:

By using a roller as the extendible mechanism, the bag can be pulled down to a desirable level suited to various dashboard configuration and users'individual needs. When the bag is not in use, it can be folded and retracted back to a compacted form neatly placed below the windshield.

By means of a suction-cup assembly, the whole device can be conveniently attached to and detached from the inside of an auto windshield.

With a plastic or metal opening device, the bag opening can be enlarged to different widths to meet different needs and maintained in an open form. The frame also makes it easy to close the bag.

Furthermore, the bag has a plastic or metal opening frame and tabs fastened thereon to facilitate the optional use of disposable plastic or paper bags placed within the foldable bag.

The foregoing and additional objects physical features and advantages will become apparent from the following description and drawings:

REFERENCE NUMERALS IN DRAWINGS

10 Suction cup 11 Right suction cup bracket 12 Left suction cup bracket 13 Adjustment head Knob with screw 14 Bracket support 15 Locking washer 16 Roller cover 17 Left side cap 18 Right side cap 19 Roller 20 Left side chock plug 21 Right side chock plug 22 Coil spring 23 Roller barrel 24 Ratchet wheel 25 Shaft 26 Fitting 27 Pawls 28 Axle rod 29 Tightener 30 Extension web 31 Foldable bag 32 Frame rod 33 Hinge 34 Spring leaf 35 flange 36 Bag bottom panel 37 Fastening tab 38 Bag back panel 39 Hooked Velcro (TM) strip 40 Looped Velcro (TM) strip 41 Elastic band 42 Velcro (TM) fastener 43 Hook fastener.

DETAILED DESCRIPTION

Figure 1A:
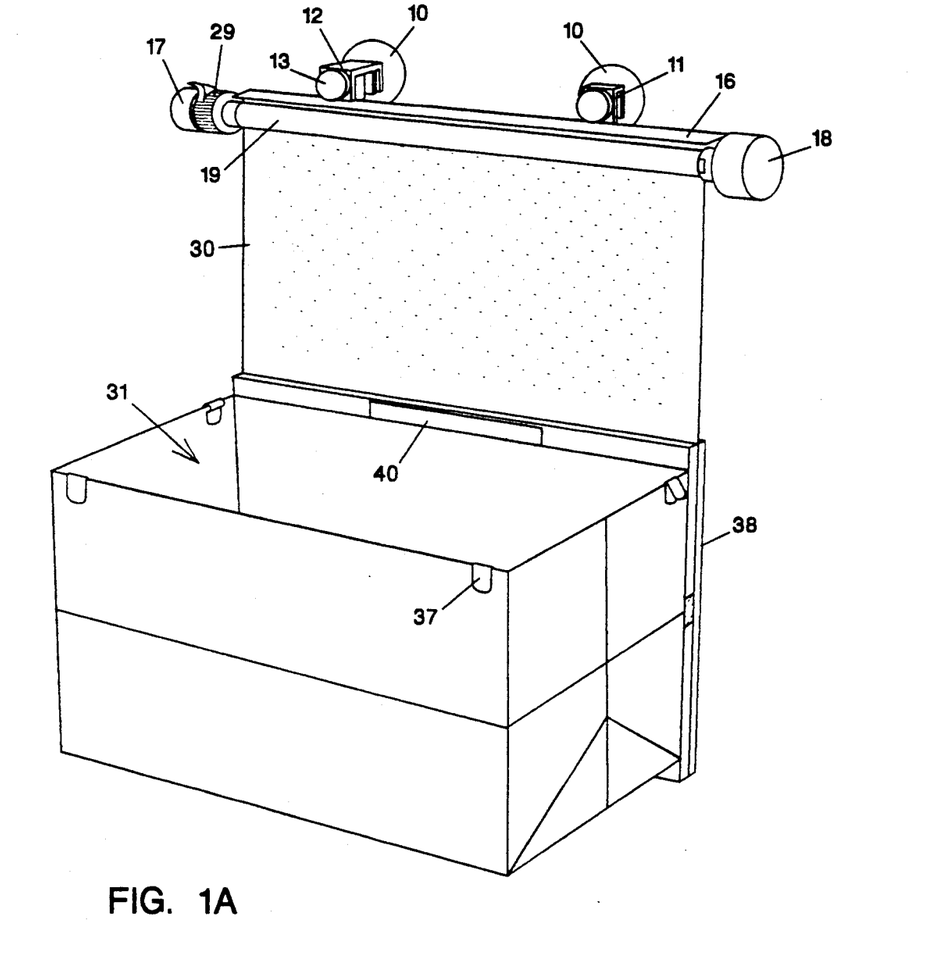
FIG. 1A is a perspective view of a foldable car bag according to the present invention, including a roller assembly and a bag in its fully unfurled position.
Figure 1B:
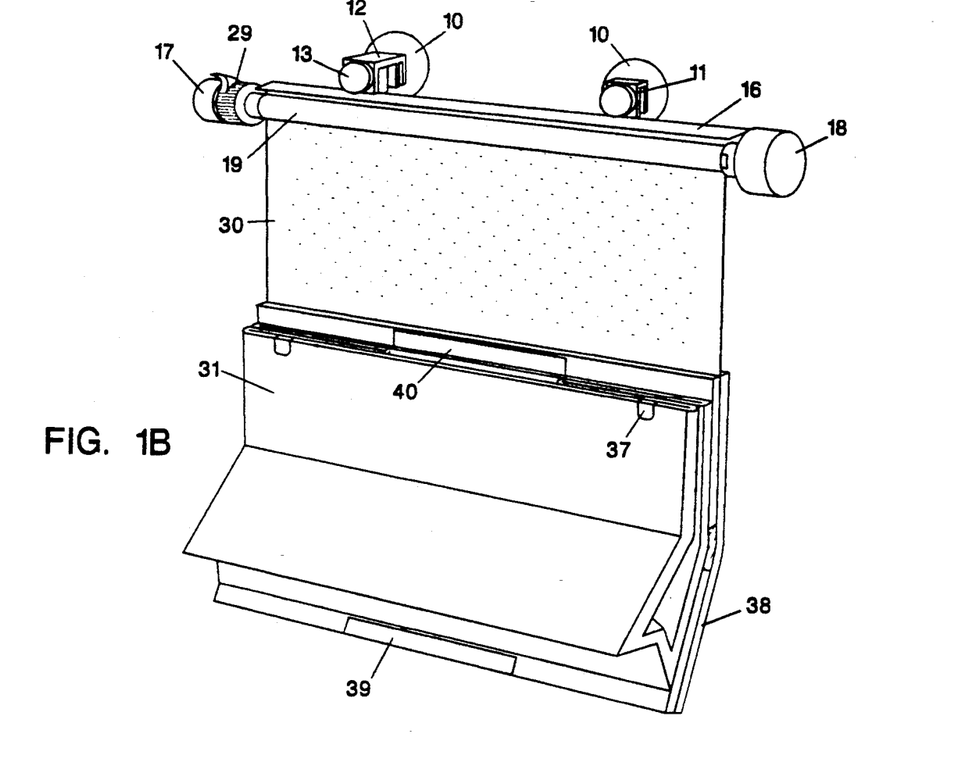
FIG. 1B shows the bag of FIG. 1A in a half-folded position.
Figure 1C:
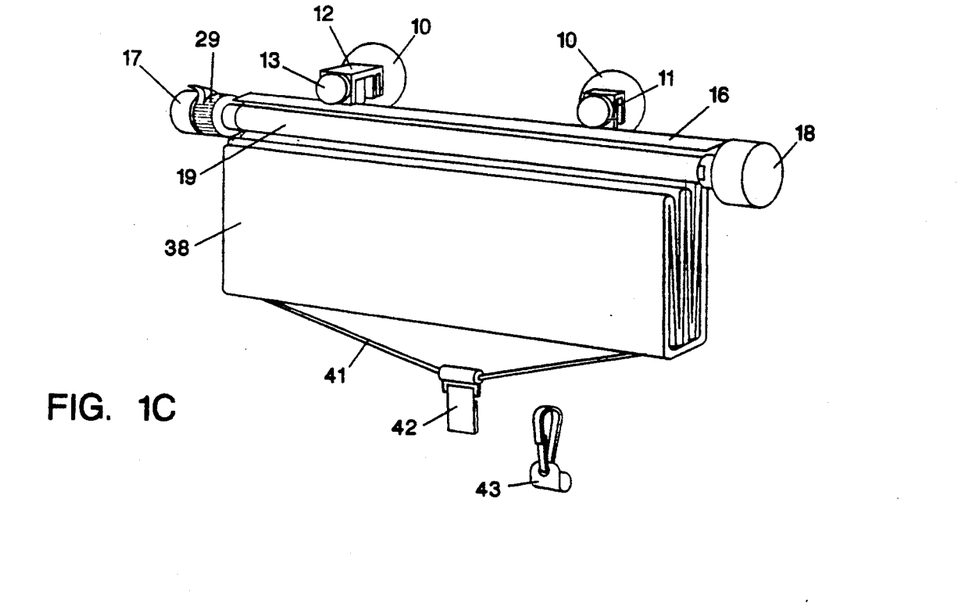
FIG. 1C shows the bag of FIG. 1A in a fully folded and rolled-up position.
Figure 1D:
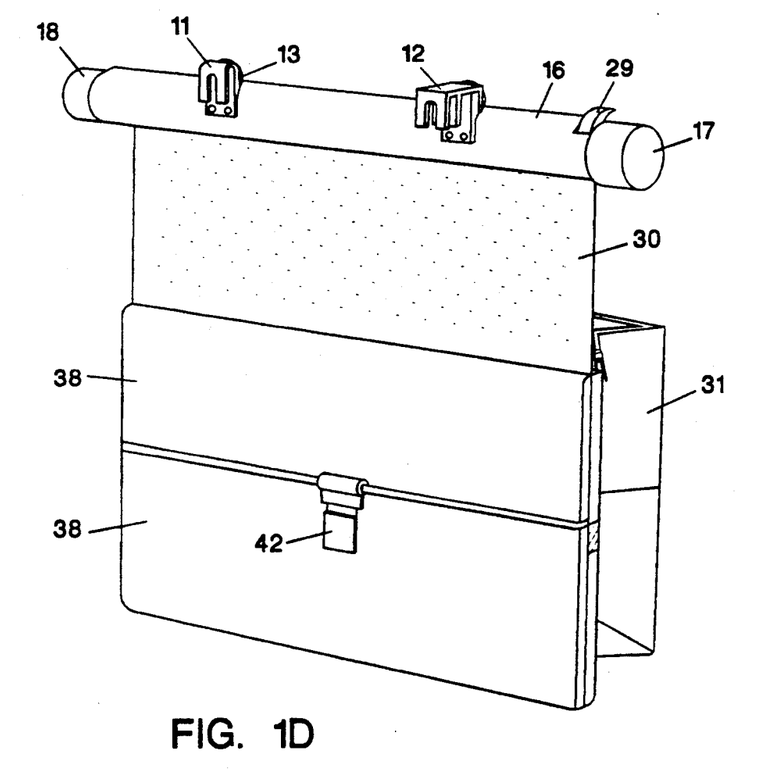
FIG. 1D is a back perspective view of the bag showing the structure of a suction cup brackets and the panel elastic band.

An overall view of a car bag according to the present invention is illustrated in FIG. 1A (front view) and FIG. 1D (rear view).

Suction cups 10 are the means of attachment for holding the entire device. Two suction cups 10 are used to provide better strength and balance. They are preferably made of rubber which has stronger suction capability than plastic.

The suction cups are clamped in two suction cup brackets 11 and 12, preferably made of plastic with the necessary strength to hold a foldable bag 30 and enough flexibility to adapt to the slope of a automobile's front windshield.

Figures 2A, 2B, 2C, 2D:
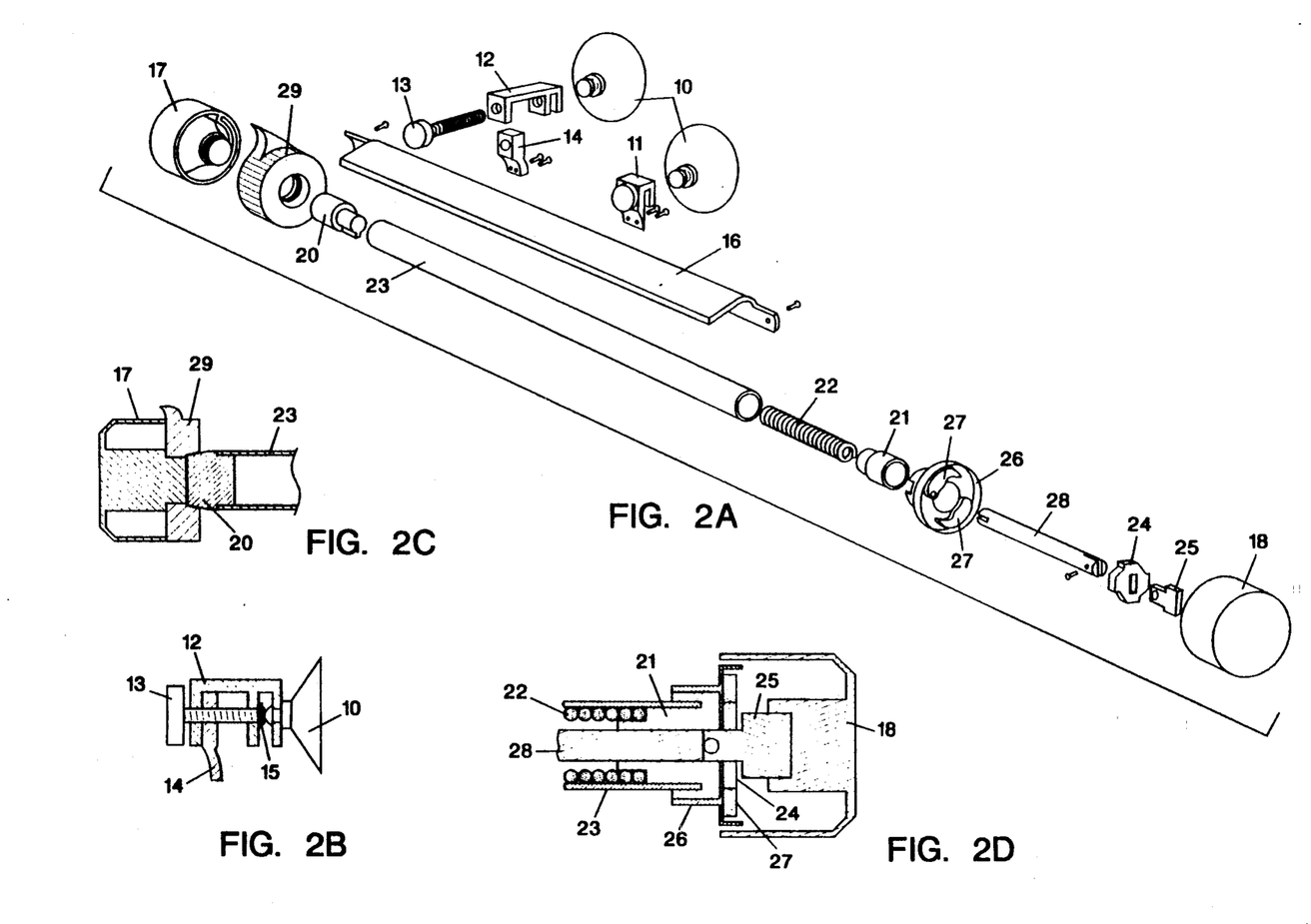
FIG. 2A is a exploded view illustrating different embodiments of the roller assembly and suction cup attachments.
FIG. 2B is a sectional view of a left suction cup assembly.
FIG. 2C is a sectional view of a roller tightener mechanism.
FIG. 2D is a sectional view of a roller spring mechanism.

Left suction cup bracket 12 has a special adjustment device for elongating and retracting the left suction cup so as to keep a roller 19 horizontal regardless of the curve the front windshield. As illustrated in FIG. 2B, the adjustment assembly embodies a screw with a head knob 13 used for turning, a support 14 with threaded hole, a suction cup bracket 12, and a locking washer 15. A head knob screw 13 has an unthreaded slot at its top section where locking washer 15 is inserted. Locking washer 15 functions to fasten bracket 12 onto screw 13, making them move together in forward and backward movements. However, it still leaves room to permit screw 13 to rotate without turning the bracket.

Adjustment for elongation of left suction cup 10 can be made by screwing in head knob screw 13 (FIG. 2B). When the foldable bag is hung on auto's side window, kitchen refrigerator, or other flat surface, the left suction cup can be readjusted to original position, aligning itself in parallel with right suction cup 10.

Suction cup brackets 11 and 12 are riveted onto a roller cover 16 (FIG. 2A). Two side caps 17 18 are affixed on both edges of roller cover 16 by two screws to form a support frame on which the roller 19 is mounted.

Roller 19 in its conventional form comprises the following parts: two side chock plugs 20 and 21, a coil spring 22, a plastic or metal barrel 23, a ratchet wheel 24 mounted on shaft 25, and a fitting 26 with two pawls 27.

Ratchet wheel 24 may have any desired number of teeth, but four have been found satisfactory for most purposes. There are two pawls 27: the upper one and the lower one. Pawls 27 have a crook at one end thereof and are pivotally mounted on one face of fitting 26 besides the ratchet 24 so that the crook of pawls are adapted to engage ratchet teeth 24. Pawls 27 rotate with fitting 26 as well as roller barrel 23. When roller 19 is pulled down and rotated in a counterclockwise direction, it can be retained at a desirable position by slowing down the pull and slightly releasing roller 19 in a clockwise direction. The stop is made possible by one of pawls 27, which is urged by its weight to be engaged with a ratchet tooth 24.

The contact between the tooth of ratchet 24 and pawl 27 crook prevents pawl 27 as well as fitting 26 from rotating in a clockwise direction. However, by jerking the roller in a counterclockwise direction, the pawl releases itself from engagement with ratchet 24, and subsequently permits the roller to rotate by the force of helical tension in a clockwise direction. The smooth clockwise movement allow pawls 27 to slide over ratchet 24 without stopping (FIG. 2A).

Coil spring 22, housed in the right section of barrel 23, is pivoted on an axle rod 28 (FIG. 2A). One end of spring 22 is inserted into a slit of chock plug 21 which rotates with barrel 23 around axle rod 28. The other end of spring 22 is mounted into an end slot of axle rod 28 which is not rotatable.

Fixation of axle rod 28 is ensured by having its flat head inserted into the flat slot of side cap 18. When the foldable bag 31 is pulled down and roller barrel 23 rotates in a clockwise direction, coil spring 22 is pulled tight and the tension of the counter pull builds.

A tightener 29 is mounted on the inside shaft of the left side cap 17 (FIG. 2A). The cylindrical portion of the tightener on the left side has female threads, which is screwed onto the shaft which has mating male threads. The cylindrical portion on the right side of the tightener has an inverted cone-shaped hole. When the tightener is pushed down and unscrewed from the shaft, it is driven toward roller barrel 23, with its inverse cone-shaped hole pressing against the moving of cone-shaped chock plug 20 on the left end of roller barrel 23. Thus it brakes the roller barrel from further movement and retains foldable bag 31 at a desirable position. This is an unique addition to the conventional roller mechanism.

A scroll of extension web 30, configured similarly to a shade, is secured at one end to on roller 19, and the other edge to bag 31. In a preferred form, it may be made of vinyl or nylon fabric, which are flexible enough to be easily wound on roller 19. Preferably, extension web 30 may have lines of small holes arranged in a regular and nice-looking form. This is to let through air from any air conditioning opening on the dashboard. As a secondary function, extension web 30 with holes can be used as sun shade by placing it on the side windows to prevent sunlight from entering the vehicle. Holes on the web are required to provide necessary visibility for the driver.

Foldable bag 31 adjoins extension web 30. Its front and side panels, made of fabric material either nylon or vinyl, are precreased (FIGS. 1A, 1B). A back panel 38 (FIG. 1C) is of two foldable plates made of thin and rigid plastic with a soft vinyl covering. It is in contact with the auto dashboard when used (FIG. 1D). A thin layer of sponge or cottonlike fabric can be sandwiched between the plastic plate and vinyl covering to ensure softness. In a more economical form, standard vinyl laminated with a cottonlike fabric can be used.

At the top, the bag is preferably constructed with one of the following opening devices:

Form A (FIG. 3A) is framed with six independent plastic or metal rods 32 joined with six stiffening hinges 33. This is to facilitate the opening and maintaining the bag in a desirable opening position.

Form B (FIG. 3B) is a similar opening and closing frame with an added spring mechanism. Four standard hinges 33 are used at the corner connections. The other two hinges, connected with two short segments, are added, each with a spring lea& 34 and a convex flange 35. When the bag is not in a fully open or closed position, and the two segments are not at either 0 degrees or 180 degrees, convex flange 35 jacks up spring leaf 34. This creates a resilient pressure, urging the two segments to return or stay at either at 0 degrees or 180 degrees. This mechanism is used to facilitate unfurling and closing bag 31 as well as holding it fully open position when in use.

Form C is more simple and economical. By attaching a rigid panel at bag bottom 36, bag 31 can be easily opened when it is unfolded from an overlapped form. The weight and rigid form of bottom panel 36 helps unfurl and maintain the opening. This opening structure requires bag's bottom panel 36 to be overlapped with the front panel when folded (FIG. 3C), which is a common way of folding most paper bags, including grocery bags.

Figure 3A:
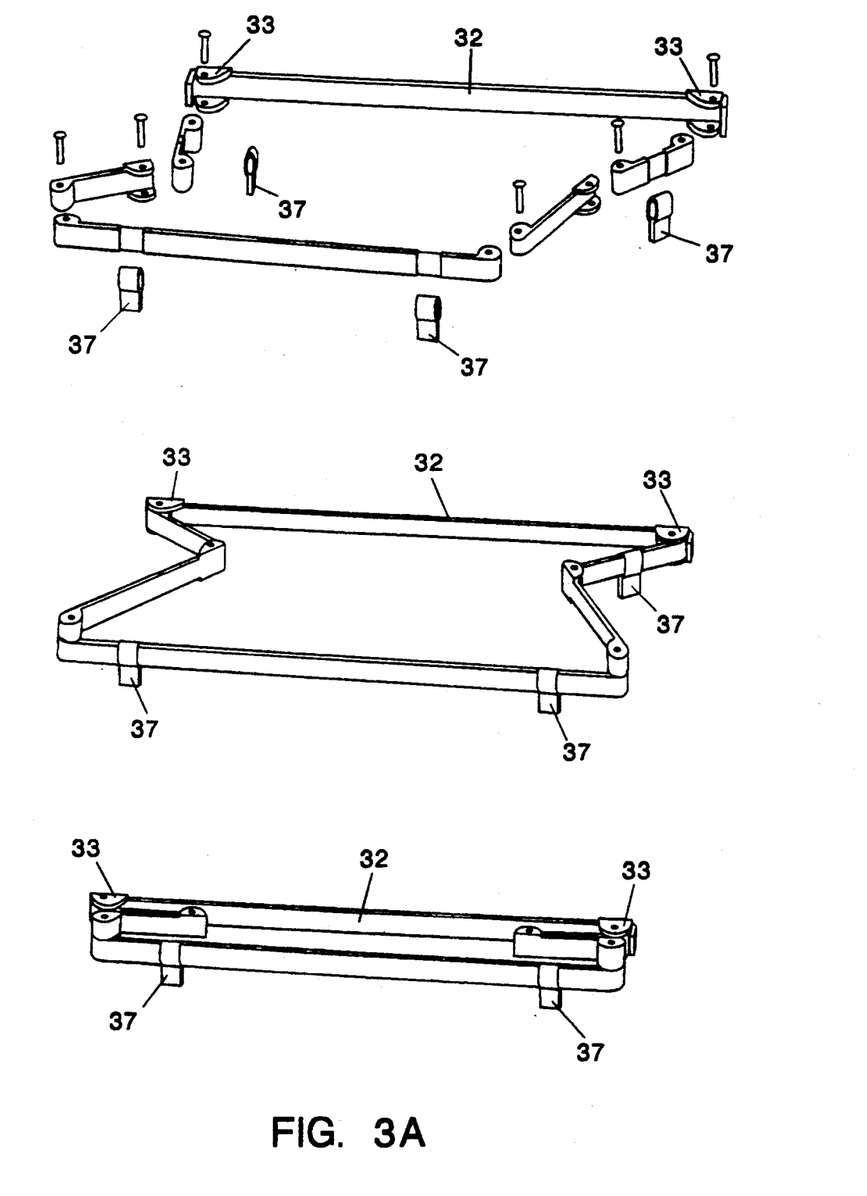
FIG. 3A shows a bag opening/closing frame with spring mechanism.
Figure 3B:
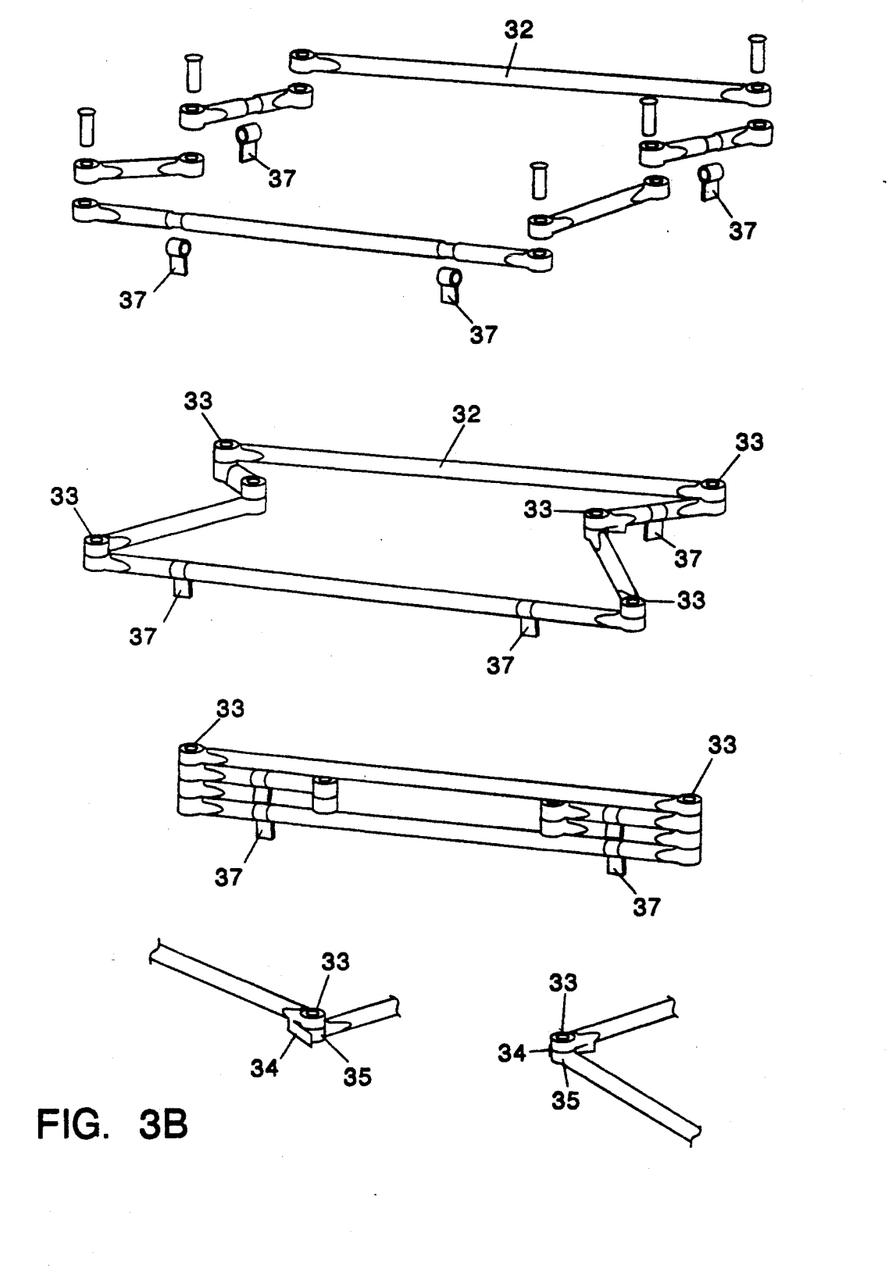
FIG. 3B shows a bag opening/closing frame with stiffening hinges.
Figure 3C:
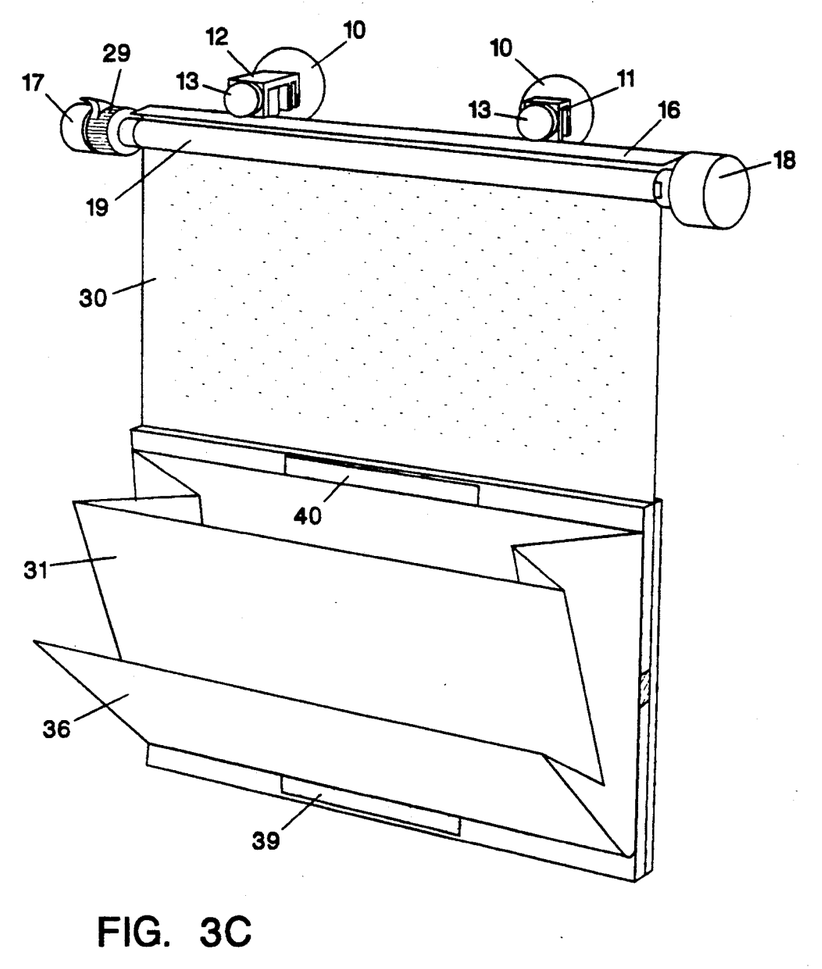
FIG. 3C illustrates a bag with a rigid bottom panel in its halfunfolded position.
Figure 4:
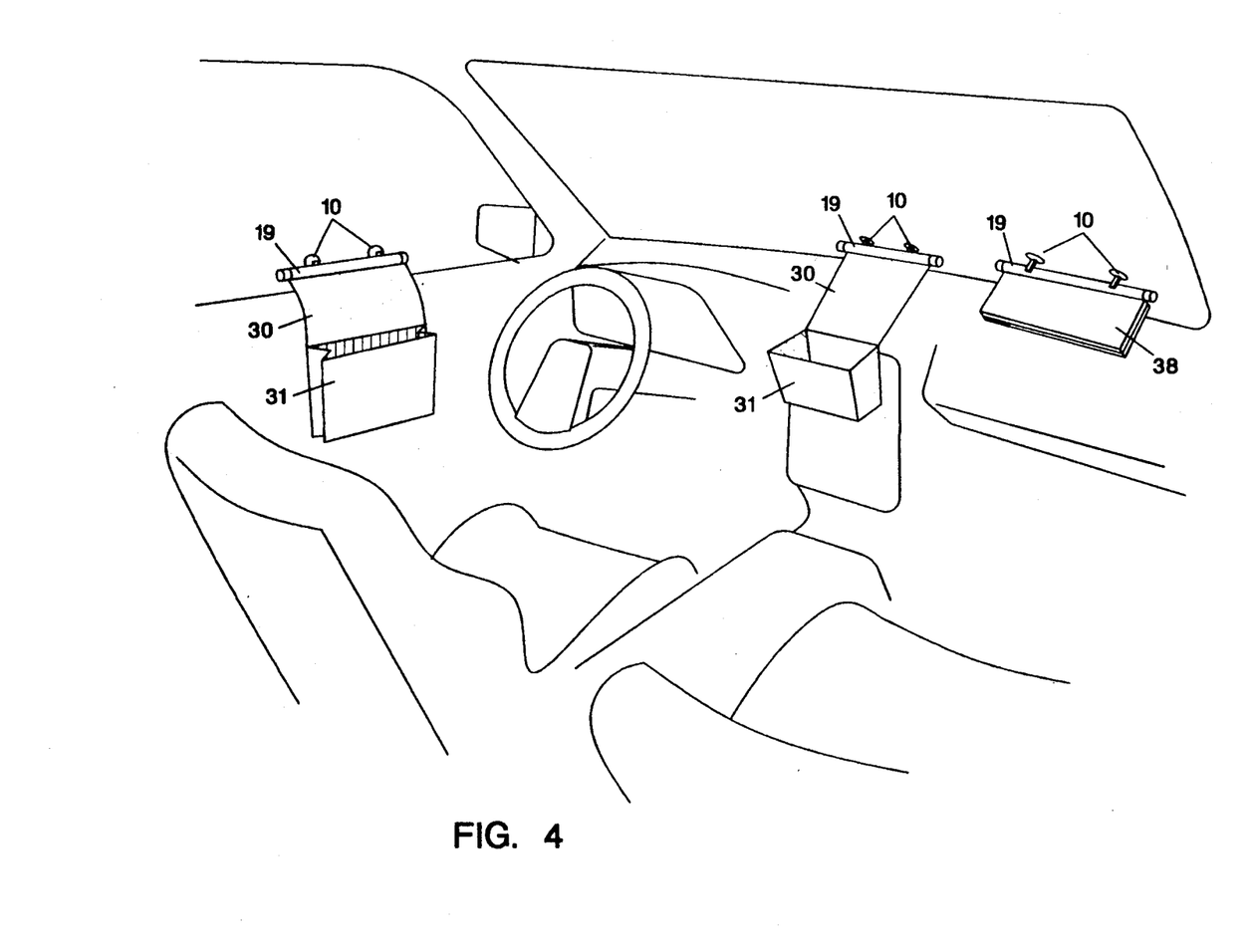
FIG. 4 illustrates the bag with its roller mechanism placed inside an automobile.

For both opening devices, Form A and Form B, several optional fastening tabs 37 can be installed (FIGS .3A and 3B), which serve to hold replaceable and disposable plastic or paper bags placed inside foldable bag 31.

As demonstrated in the upper section of FIG. 1B, when folding the bag, the hooked Velcro (TM) strip 39 adhered on the back of the bottom secures the folded bag to the top of the top of the bag where there is a looped Velcro (TM) strip 40.

As FIG. 1C illustrates, an elastic band 41 is hung from both edges of back panel 38, to which a Velcro (TM) fastener is attached. This fastener, in the form of either a Velcro (TM) strip 42 or a plastic hook 43 with a flat head, provide the bag with an additional means of attachment to the automobile. The looped Velcro (TM) strip for the fastener 42 can be adhered to an unconpicuous position under the glove compartment. Or when a flat hook 43 is used, it can be moved along the elastic band and secured to an opening or clevis under the compartment, available in most cars. However, the attachment with these means are optional as the roller bag remains stable and steady in most driving situation.

OPERATION

In general, the manner of using the foldable bag with roller mechanism is rather simple. Basically, it involves three simple steps: Pulling bag 31 down to a desirable level; retaining it by turning down tightener 29; and unfolding bag 31.

When not in use, people can have the choice of either leaving it down, or to restoring it back to an inoperative compacted form. The restoration take the reverse steps: fold bag 31; unlock the tightener 29, and jerk and roll up bag 31.

One need not attach the device to the windshield or adjust the suction cup repeatedly, only for the first installation or to reposition it. As suction cup attachments in automobiles become increasingly popular, this device will be very acceptable.

SUMMARY, RAMIFICATIONS, AND SCOPE

Thus the reader will see that 1 have provided a vehicle container which has the advantage of quickness and ease of use. By combining such advantages as being extensible, retractable, and removable, it is well suited to the use inside an automobile where space is scarce.

Its adaptability to an auto dashboard and its capability of being positionable close to the driver furnishes a solution for holding fast foods and things which driver desires to have within easy reach.

Its bag opening frame and disposable bag fastening mechanism provide convenience to readily receive litter.

By combining the two popular and simple acts, i.e., pulling a shade and folding a paper bag, the operation of present bag is also simple and easily acceptable. And its simple and combination of conventional mechanical structure also make it easy for manufacturing.

The present device has multiple uses: The bag may serve to hold food bag, maps, newspapers, a cellular phone, sunglasses, litter, and a great variety of things. The extension web, which is connectable to the roller and foldable bag, is made of vinyl with dense holes, which are for letting air through from any possible air conditioning opening. But these holes also provide the necessary visibility which makes possible for an additional use as a sun shade when necessary. This device can also be used in boats, planes, kitchens, offices, and bathrooms where there is a need for a expandable bag, or a convenient means of attachment.

Figures 5A, 5B:
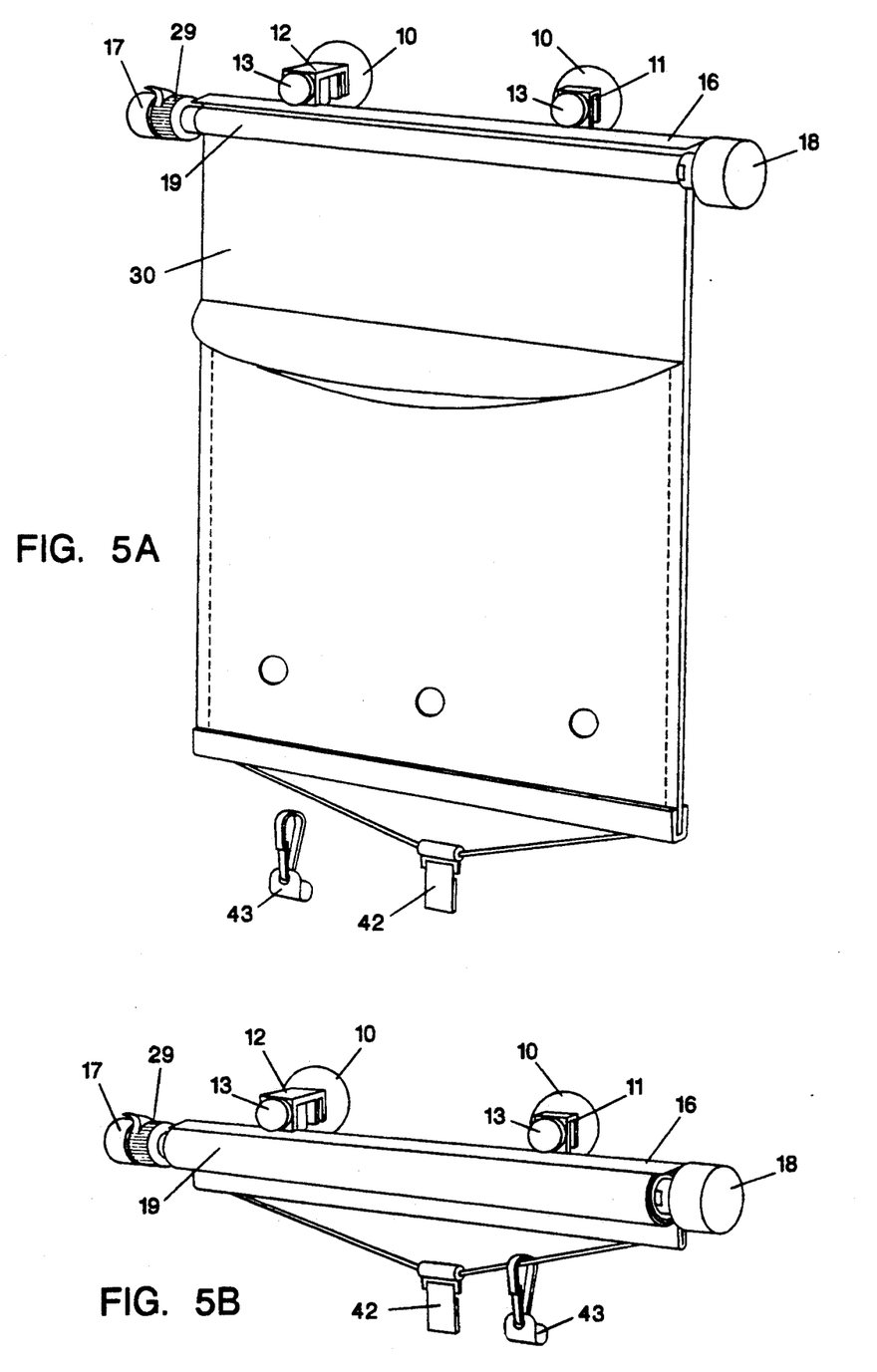
FIG. 5A is a form of ramification of the bag of FIG. 1 in which the bag is can be entirely rolled into the roller.
FIG. 5B shows such ramification form in its rolled up condition.
Figure 6:
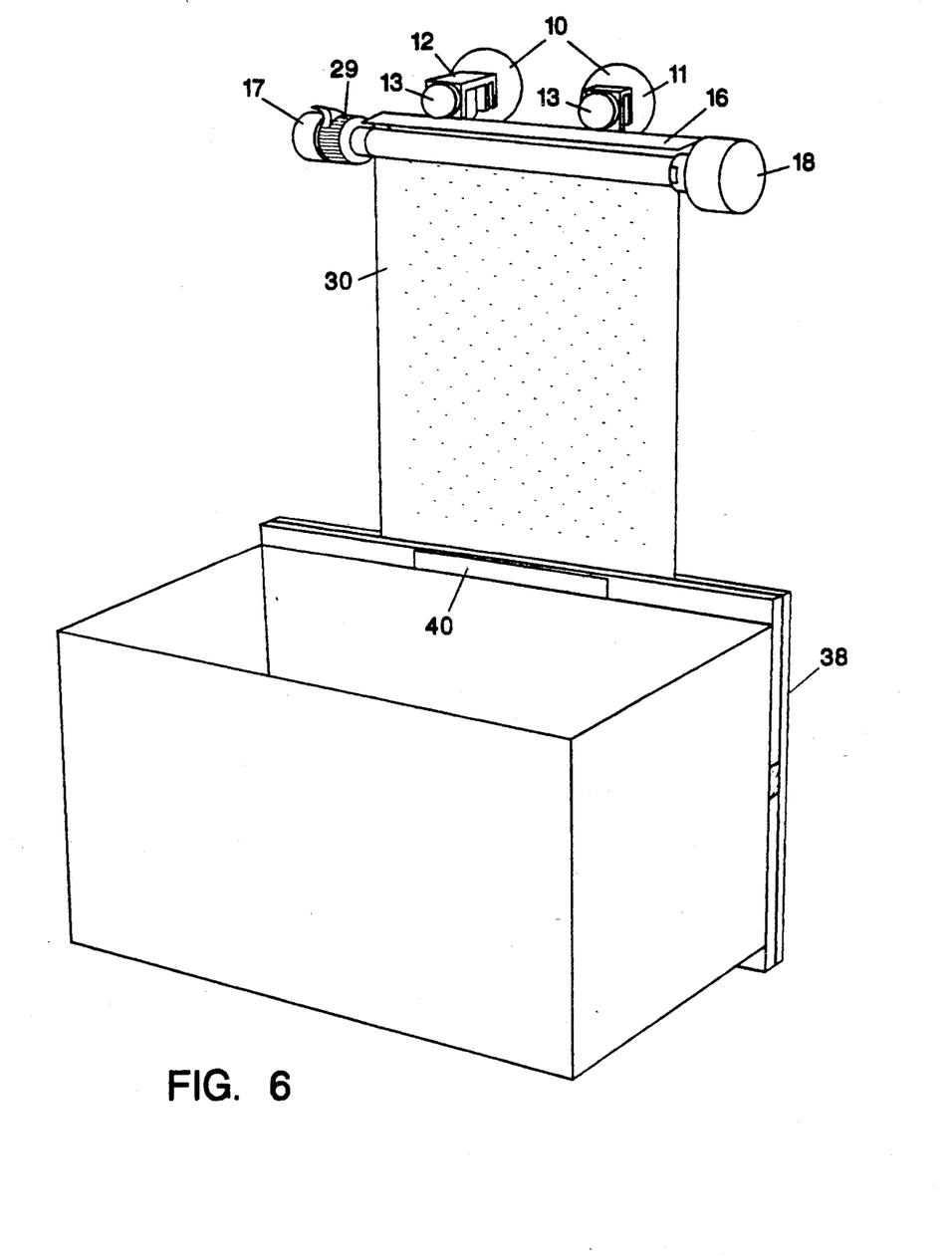
FIG. 6 is another form of ramification of the bag of FIG. 1 with a narrow extension web.

While the invention has been described with many specificities, it will be understood that this description is only intended to provide an illustration for some of the presently preferred embodiments of this invention and not to limit its scope. Many other ramifications are possible. For example, the roller 19 may adjoin a flexible bag which can be entirely rolled up into the roller (FIG. 5A, 5B), the foldable bag may be folded in a variety of ways; the extension web may be changed to a narrow strip (FIG. 6) or other forms, the foldable bag with its roller assembly may have other means of attachment, and the entire device may reduced in size to accommodate different circumstances.

I claim:

1. A Container which is especially usable in a motor vehicle, comprising:
  a bag having a closed bottom and sides and an open top, said bag having sufficient flexibility to be folded,
  a rollable web having one end attached to said open top of said bag and extending therefrom,
  roller means attached to an end of said web opposite said one end thereof for rolling said web in a coil so that said open top of said bag is adjacent said roller means, and for allowing said web to be unrolled so that said open top of said bag is spaced from said roller means,
  said bag having a rigid back panel, for aiding said bag to retain its shape, and
  said bag having an elastic band attached thereto for aiding in the attachment of said bag to said vehicle.

* * * * *